United States Patent [19]

McCalley et al.

[11] Patent Number: 4,829,372

[45] Date of Patent: May 9, 1989

[54] PRESENTATION PLAYER

[75] Inventors: Karl W. McCalley, Palatine; Steven D. Wilson, Chicago; James L. Fischer, Barrington, all of Ill.

[73] Assignee: Telaction Corporation, Schaumburg, Ill.

[21] Appl. No.: 87,668

[22] Filed: Aug. 20, 1987

[51] Int. Cl.[4] .............................................. H04N 7/10
[52] U.S. Cl. ...................................... 358/86; 358/146
[58] Field of Search ......................... 358/86, 146, 147; 455/4

[56] References Cited

U.S. PATENT DOCUMENTS

| | | | |
|---|---|---|---|
| 4,450,477 | 5/1984 | Lovett | 358/86 |
| 4,450,481 | 5/1984 | Dickinson | 358/86 X |
| 4,680,629 | 7/1987 | Fukushima et al. | 358/147 |
| 4,734,764 | 3/1988 | Pocock et al. | 358/86 |
| 4,757,371 | 7/1988 | Nozawa et al. | 358/86 |

FOREIGN PATENT DOCUMENTS

| | | |
|---|---|---|
| 1112380 | 11/1981 | Canada . |
| 1152206 | 8/1983 | Canada . |
| 190550 | 8/1986 | European Pat. Off. ............. 358/86 |

Primary Examiner—Keith E. George
Attorney, Agent, or Firm—Amster, Rothstein & Ebenstein

[57] ABSTRACT

The present invention relates to a presentation player which is utilized in a digital, interactive communication system accessible to a plurality of subscribers who can select any of a plurality of pre-recorded video/audio presentations for viewing on their television sets. The presentation player includes a converter which is tuned to a channel for monitoring a digital stream of information including digital packets representative of the video/audio presentations selected by subscribers. These digital packets of information include an address assigned to the particular requesting subscriber. In accordance with this addressing information, a controller distributes the digital packet of information to one of a plurality of subscriber servers housed within the presentation player. The subscriber server receiving the uniquely addressed digital packets converts the packet into an NTSC-compatible analog formatted video/audio presentation for transmission to the requesting subscriber.

15 Claims, 4 Drawing Sheets

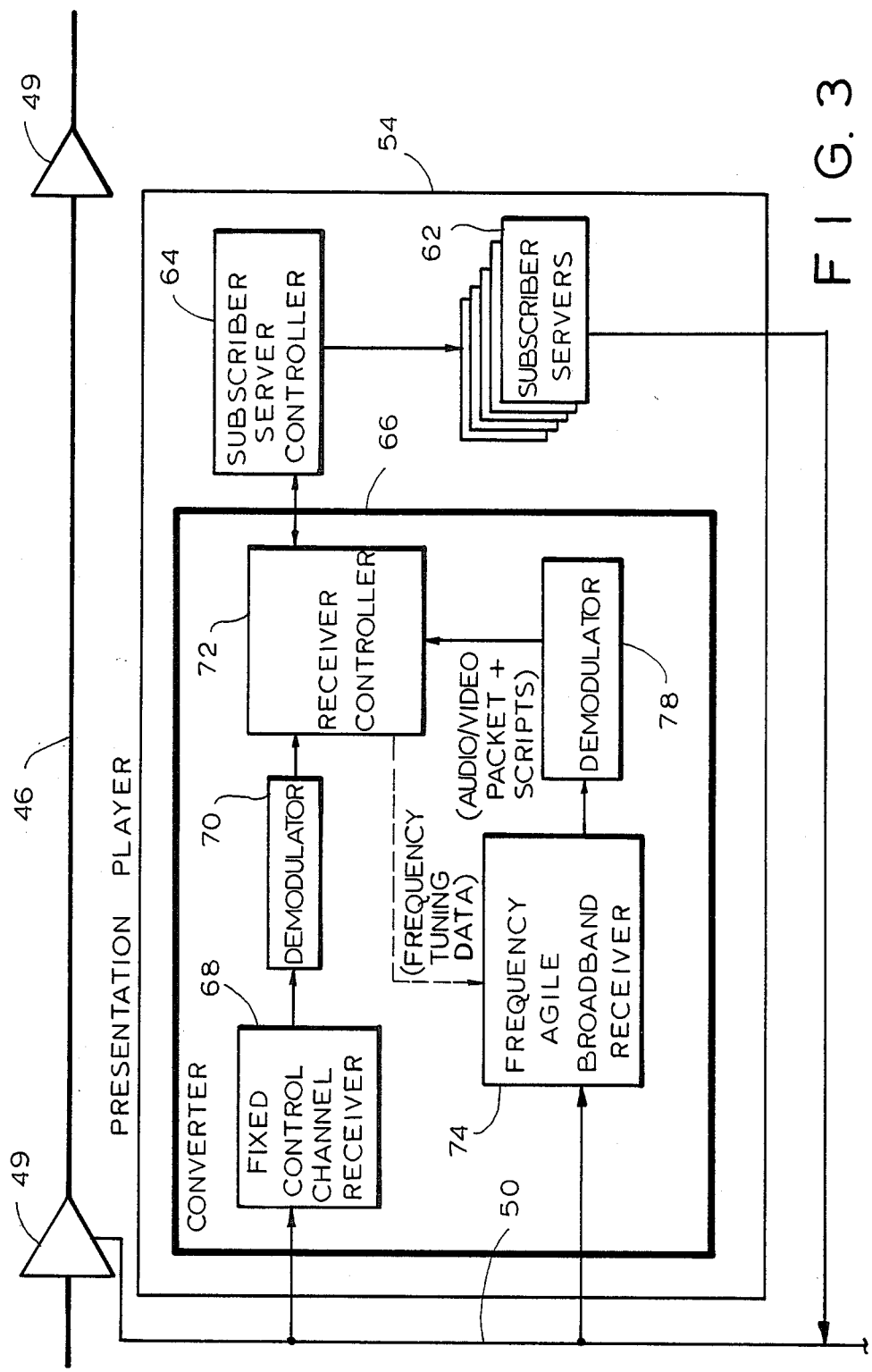

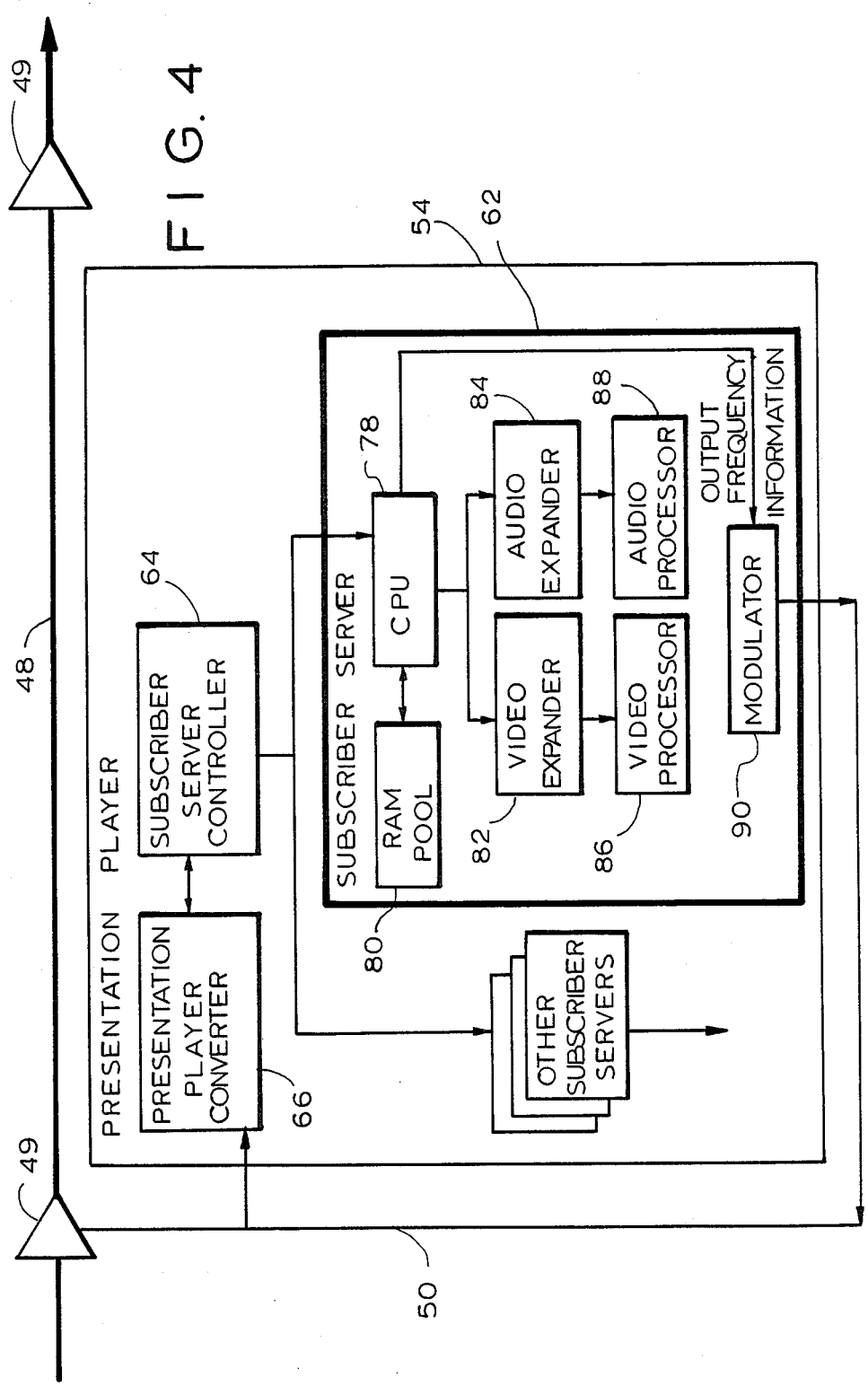

PRESENTATION PLAYER

FIELD OF THE INVENTION

The present invention relates in general to digital, interactive communication systems, capable of transmitting at a subscriber's request still-television video frames, possibly with an accompanying audio message, and more particularly to a presentation player which receives a stream of digital packets through a standard CATV distribution trunk, converts the digital packets into the selected video presentation with accompanying audio and transmits such presentation to the requesting subscriber on a pre-assigned output channel within a standard CATV distribution feeder.

BACKGROUND OF THE INVENTION

Conventionally, different kinds of communication systems are used to provide voice, data, and video communication services to subscribers. In particular, interactive cable television systems have been developed to distribute information to subscriber's televisions at their requests. One such system concerns a shopping service where subscribers shop at home in an "electronic mall". This system is distinguished from home shopping channels since it allows subscribers to select which products or services they will view on their television screens by use of in-house subscriber apparatus, such as telephones or CATV key pads. In operation, the subscriber tunes to a channel and requests connection to a remote location by dialing a predetermined telephone number, or accesses via a CATV reverse channel. As soon as the system identifies the subscriber, his television screen begins to display still-frame video, and possibly accompanying audio, and directories of "electronic stores" comprising products or services that may be entered or passed, examined in further detail, saved for future consideration, or purchased just by touching keys on a touch-tone telephone in response to prompts on the television screen. A main-frame host computer controls the flow of information in the system.

This shopping service uses a CATV network to distribute the video presentations and accompanying audio messages requested by subscribers. At various locations in the CATV network, a device known as a frame store unit captures the video and audio portions of a presentation. Each of these locations serves a small group of subscribers. The function of each frame store unit is to capture the video frames destined for subscribers assigned to the particular frame store unit. The frame store unit captures a video frame bearing the address of an assigned subscriber and converts the frame into a form it can store. Next, the frame store unit determines which audio message to associated with the video frame, bundles the audio and video together by time multiplexing the video on one channel and frequency multiplexing the audio on another channel, and then injects the result into he CATV feeder cable. The composite signal transmitted by the frame store unit appears as a standard television picture on the subscriber's television.

The audio and video signals processed by the frame store unit are in analog format. This is in sharp contrast to the presentation player of the present invention which receives and processes both the video and audio portions of a presentation in digital format. Moreover, the presentation player time multiplexes both the video and audio on a single channel.

The advantages of the presentation player over the frame store unit are numerous. The presentation player makes it possible for the interactive communication system to service more subscribers than the prior system because both the audio and video signals are time multiplexed on one channel. Moreover, the digital processing of these signals results in improved distortion immunity, improved audio fidelity, and an improved capability to maintain the integrity of the video portion of a presentation. An additional advantage of digital processing is an increase in the portion of the CATV frequency spectrum usable for transmission of the proposed audio/video service.

Thus, the digital processing and time multiplexing of both audio and video by the presentation player offers significant advantages over the frame store unit used in other interactive communication systems.

SUMMARY OF THE INVENTION

An objective of the present invention is to overcome the deficiencies of the prior art noted above by providing a presentation player which can be utilized in a digital, interactive communication system capable of transmitting to subscribers television quality, still-video and motion-video presentations with accompanying audio.

It is another object of the presentation player of the present invention to process both video and audio signals in a digital format and thereby provide a more accurate reproduction of the original signals.

It is a further object of the present invention to operate the presentation player as part of a new and improved interactive communication systems for merchandising products and services to subscribers.

The present invention is directed to a presentation player used in an interactive communication system wherein subscribers select from a plurality of video/audio presentations for viewing on their television sets. The video/audio presentations are transmitted in the form of digital packets of information to a plurality of presentation players strategically located in the vicinity of the subscriber. Each of the digitized packets transmitted to the presentation players is uniquely addressed to a requesting subscriber.

The presentation player includes a converter, a controller, and at least one subscriber server. The converter is tuned to a fixed-frequency, narrow-band control channel which broadcasts tuning information. This tuning information causes the converter to tune to a broad-band channel where it monitors a digital stream of information including the digital packets representative of selected video/audio presentations. The converter also detects for further processing the digital packets uniquely addressed to predetermined ones of the requesting subscribers.

The controller means receives the uniquely addressed digital packets from the converter and transmits each of these packets to a pre-assigned subscriber server according to the packets unique address. That is, each presentation player processes the digital packets addressed to specific subscribers. More specifically, each subscriber server within a presentation player is in turn responsible for processing the digital packets of certain subscribers. The subscriber server receives the digital packets, converts them into analog formatted (conventional NTSC) video/audio presentations which are then transmitted to the requesting subscriber.

BRIEF DESCRIPTION OF THE DRAWING

For a fuller understanding of the nature and objects of the invention, reference should be made to following detailed description, taken in connection with the accompanying drawings.

FIG. 3 is an exploded block diagram of the presentation player converter shown in FIG. 2.

FIG. 4 is an exploded block diagram of the subscriber server shown in FIG. 2.

DETAILED DESCRIPTION OF THE INVENTION

Figure 1:
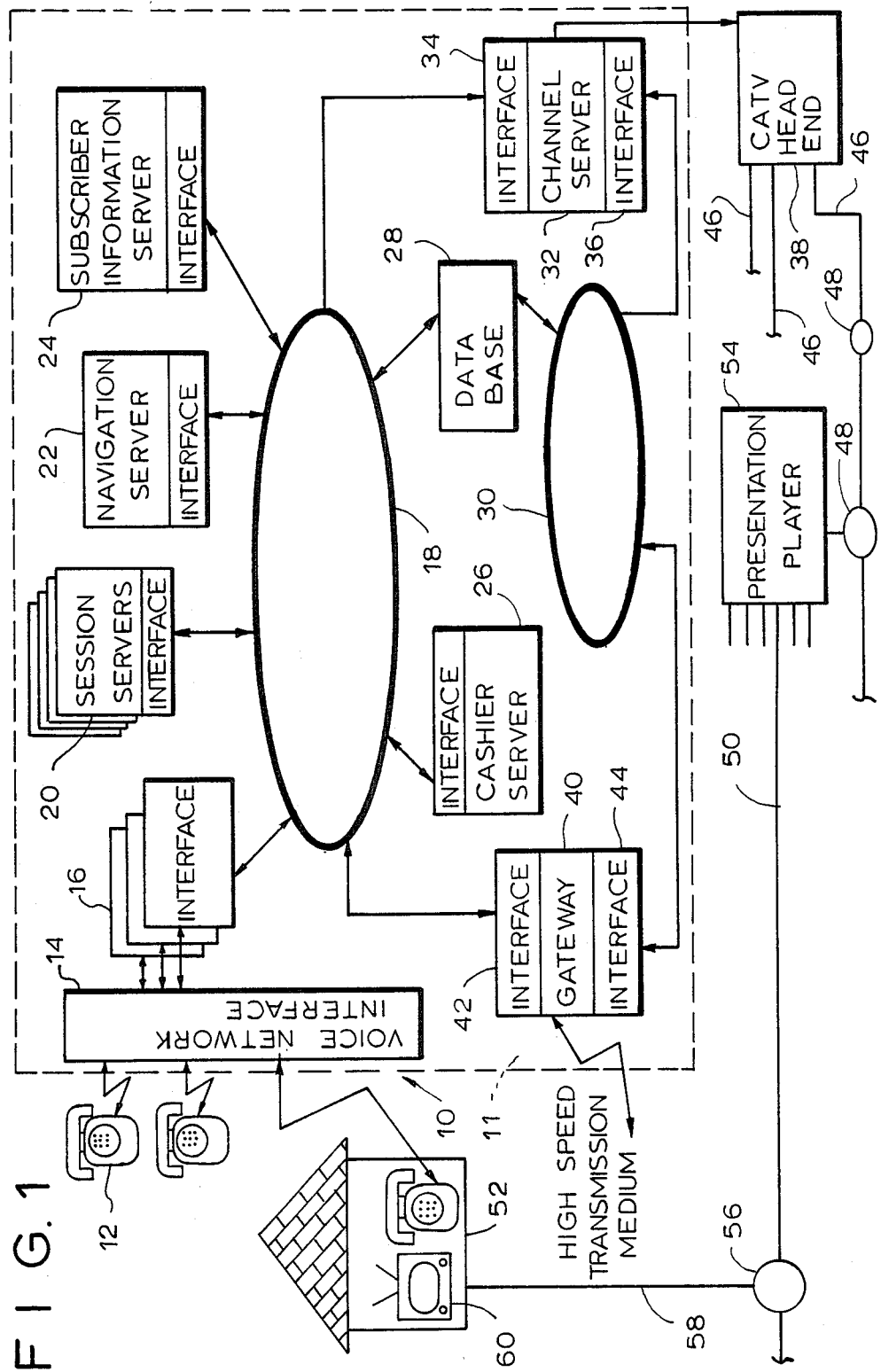
FIG. 1 is a block diagram of a digital, interactive communication system which in conjunction with a CATV network and the presentation player of the present invention provides subscribers with television quality, still-video presentations.

Referring to FIG. 1, the presentation player of the present invention is utilized in conjunction with a digital, interactive cable television system generally designated as 10. In the operation of system 10, a subscriber uses a Touch-Tone telephone 12 to communicate with the system 10. The transmission signal sent through telephone 12 are carried over conventional telephone lines to a Local Operating Center ("LOC") 11 of the system 10, which makes use of local area network technology. At the LOC 11, the tone-signals of telephone 12 are received by a voice network interface ("VNI") 14. If the tone-signals are conventional voice grade transmissions, they are transmitted to VNI 14 in analog format and are recognized and decoded by VNI 14 to ACII characters recognized by an interface 16. In the instance where the tone-signals are received by NVI 14 as digital signals, VNI 14 likewise transforms the digitized Touch-Tone signals into protocol recognized by interface 16. VNI 14 could be a Summa Four, Inc., Specialty Digital Switch Model No. SDS-1000 having a predetermined number of outgoing telephone lines for bridging incoming subscriber calls to service representatives when required. Notwithstanding whether the tone-signals are in digital or analog form, the output signal of VNI 14 is transmitted to a first local area network ("LAN") 18 via the interface 16. While VNI 14 is shown in FIG. 1 as being located at the LOC 11, it is anticipated by the present invention that VNI 14 need not be co-located at the same location as LOC 11.

The network topology of first LAN 18, that is the physical organization of the network, is known as a ring topology. A ring topology has all devices in the network connected by a single communications cable that forms a circle or ring. Signals are sent from one device to another around the ring. As a signal moves around the ring, each device in the LAN electronically detects whether the message if for it. If it is, the device processes the signal. If not, the device will normally regenerate the signal and transmit it to the next device in the ring.

Network access identifies the procedures that allow each device in the network to communicate and receive data. The network access method used in LAN 18 is conventionally known as token passing. A token is a special bit pattern that constantly travels around the network. Every device in the network must wait until it receives the token, before it can transmit its message, reinserts the token in the network, which is then passed to the next device in the network. If a device has no message to send, it allows the token to pass to the net device in the network. In effect, possession of the token is permission to transmit a message.

The transmission medium connecting devices in LAN 18 can be either a broadband or a baseband coaxial cable. Baseband coaxial cable carries one signal at a time, but the signal travels at a rapid speed-in the range of ten million bit per second. Any of a number of conventional methods are used to allow many devices to access LAN 18 concurrently.

The devices comprising LAN 18 include a plurality of single-board computers each having a special function in serving the subscribers, as well as a random access memory, a clock, and input/output facilities. The single-board computers each include specialized application software and are associated with an interface which connects it to LAN 18. In addition to the single-board computers, LAN 18 further comprises a large-scale data base 28 conventionally referred to as a "disc farm". Stored in the data base's hard disk memory units is digital information representing video presentations of goods or services. Generally, these video presentations comprise television quality, still-frame images, or textual information, or textual information overlaid on a still-frame image, or any combination of the foregoing. These video presentations may be accompanied by an audio message and are referred to hereafter as "video/audio presentations". Any of these stored video/audio presentations can be viewed by a subscriber upon request during any session on the system 10. Also stored in data base 28 is navigational information describing the pathways between presentations, as well as information about subscribers. Typically, the companies offering goods or services to subscribers develop a structure of video/audio presentations representing an electronic store.

One example of the single-board computers coupled to LAN 18 are those manufactured by Intel Corporation of Santa Clara, Calif. and are designated as Model No. iSBC 36/100 or Model iSbc 186/100. The computers are denoted according to their functional application in the LAN 18, and are identified in FIG. 1 as the session server 20, navigation server 22, subscriber information server 24, and cashier server 26. While the servers 20,22,24, and 26 are each identified by a single functional task, the present invention anticipated that each server will have appropriate software so that the server can switch functions depending on the demands of system 10. During any subscriber session on system 10, one session server 20 will be dedicated to serving a particular subscriber. The number of session servers 20 at any LOC 11 will depend on the number of subscribers serviced by the LOC 11. Accordingly, the number of session servers 20 at a LOC 11 could be anywhere in the range of 100 to 2,000 units.

The output message from VNI 14 is transmitted through interface 16 to one of the plurality of session servers 20. Interface 16 associates an incoming subscriber call to an available session server 20. The session server 20, like all the servers comprising the LAN 18 is itself connected to LAN 18 by means of an interface. Though each server is shown in FIG. 1 as connected to an interface, in the physical construction of LAN 18 an interface may be shared by a plurality of servers.

Session server 20 processes the message by translating or converting it into some logical signal that the other servers understand, and then passes the signal on to LAN 18 for further processing by the other servers. In essence, the session server 20 interprets the digital signal representing a key on the Touch-Tone telephone 12 and sends out a command or commands to other servers on LAN 18. Included in these commands are the subscriber's requests for selected presentations.

Navigation server 22 includes a dynamic RAM memory which can store at any instance sufficient information to enable the subscriber to move about any of the clients' presentation structures. The information stored in navigation server 22 defines the pathways between the presentations in any presentation structure. Since navigation server 22 incorporates a dynamic RAM memory, it will only store navigation information that is useful at any particular time in a subscriber session. Typically, the dynamic RAM memory of navigation server 22 has approximately 10 megabytes of RAM memory. Thus navigation server 22 is not capable of storing all of the clients' presentation networks within its memory. This information is stored in the hard disk memories of data base 28.

In operation of system 10, the subscriber designates the presentation or presentations he desires to view by depressing keys on Touch-Tone telephone 12. The digitized signals which represent the depressed telephone keys are processed by session server 20 and are addressed to navigation server 22. Navigation server 22 fetches from data base 28 the navigational data needed at that time to move about a presentation network in accordance with the subscriber's requests. Thus, for example, as the subscriber requests information within a specific presentation structure, the dynamic memory will only store navigational information about that portion of the presentation network that could be requested by the subscriber at that particular time in the subscriber session. A the session proceeds and the subscriber moves about the presentation structure, the navigation information within the dynamic memory will change with the subscriber's movement in the structure. According to this navigational data stored within its dynamic memory, and from its interpretation of the digitized signals of session server 20, the navigation server 22 determines which of the presentations stored in data base 28 have been selected by the subscriber and transmits a signal through LAN 18 for the data base 28 to transmit the requested presentations to the subscriber.

Subscriber information server 24 stores information about system 10 subscribers. The information stored abut each subscriber includes the subscriber's telephone number, the subscriber's personal identification number, and it identifies a presentation player designated to receive the subscriber's requested presentations. As will be explained in more detail below, the presentation player receives, stores, and re-transmits to the subscriber those presentations requested by the subscriber.

Typically, server 24 is active for only a portion of any subscriber session. In the operation of the system 10, session server 20 queries subscriber information server 24 for information concerning a subscriber. Server 24 then fetches the requested information and sends it to session server 20 which stores the information in its memory. Since session server 20 is active during the entire subscriber session there is no further need to query server 24 for information during the remainder of the subscriber's session.

Cashier server 26 processes all information concerning the subscriber's purchases of merchandise or services. For example, cashier server 26 queries the subscriber as to the means by which he intends to pay for purchases. If the subscriber selects a credit card as means for payment, cashier server 26 accesses the subscriber's credit card identification number from data base 28 and transmits an appropriate message to an authorization service so that the purchase is charged to the subscriber's credit card. Another function of cashier server 26 is to advise the clients of purchases so that the goods are sent expeditiously to the subscriber.

Purchase information can be transmitted on-line to the client or it can be stored in cashier server 26 and 'batched' to a client at a later time. For example, all purchases made during a given period are stored by cashier sever 26 in a storage data file, but at the send of the period they are sent in batches to the various clients for further processing. Cashier server 26 can also describe the means by which the purchased goods will be delivered to the subscriber. That is, it will advise the client whether the goods are to be shipped and by which means, or whether the subscriber will pick up the goods at the clients'. store.

A second LAN 30, also a ring topology, is connected to data base 28 for sending the digital signals representing the video/audio presentations to a CATV system. Transmission of a single video frame requires approximately 30 kilo-bytes to 50 kilo-bytes of information. Since a large number of bytes of digital information is required to represent the video or image portion of a presentation, second LAN 30 is needed since it accommodates a larger quantity of digital information at a higher rate of speed than first LAN 18. To meet this requirement, the transmission medium of second LAN 30 is a broadband medium and preferably a fiber optic cable comprising several optical fibers having a broader bandwidth than first LAN 18 which transmits sever hundred thousand bits of information per second.

A channel server 32 receives subscriber control information from first LAN 18 and information representative of selected video presentations from second LAN 32 for transmission to a CATV head end 38. Interface 34 and interface 36 respectively couple channel server 32 to first LAN 18 and second LAN 30. Channel server 32 comprises a microprocessor, a RAM memory of several megabytes, a forward-error correction encoder, and a modulator. The video, audio and control information received by channel server 32 is converted into a high-speed digital stream and modulated so that it is suitable for transmission by a cable television network. Channel server 32 also schedules the order in which the information is sent to the cable television network, and performs forward-error correction coding to assume reliability in transmission by the cable television network.

Typically, a LOC 11 wills service approximately 5,000 to 10,000 subscribers depending on its location. Each LOC 11 is capable of communicating with other LOC's by means of a gateway 40 which in turn communicates with a higher-speed transmission medium, such as a broadband terrestrial or a communication satellite. Gateway 40 comprises a microcomputer having a memory of at least several megabytes, and is coupled to first LAN 18 and second LAN 30 by interface 42 and interface 44, respectively. In communicating with other LOC's, LOC 11 can request information, such as a video/audio presentation not found in its data base 28, and can in turn respond to the requests of other LOC's.

Figure 2:
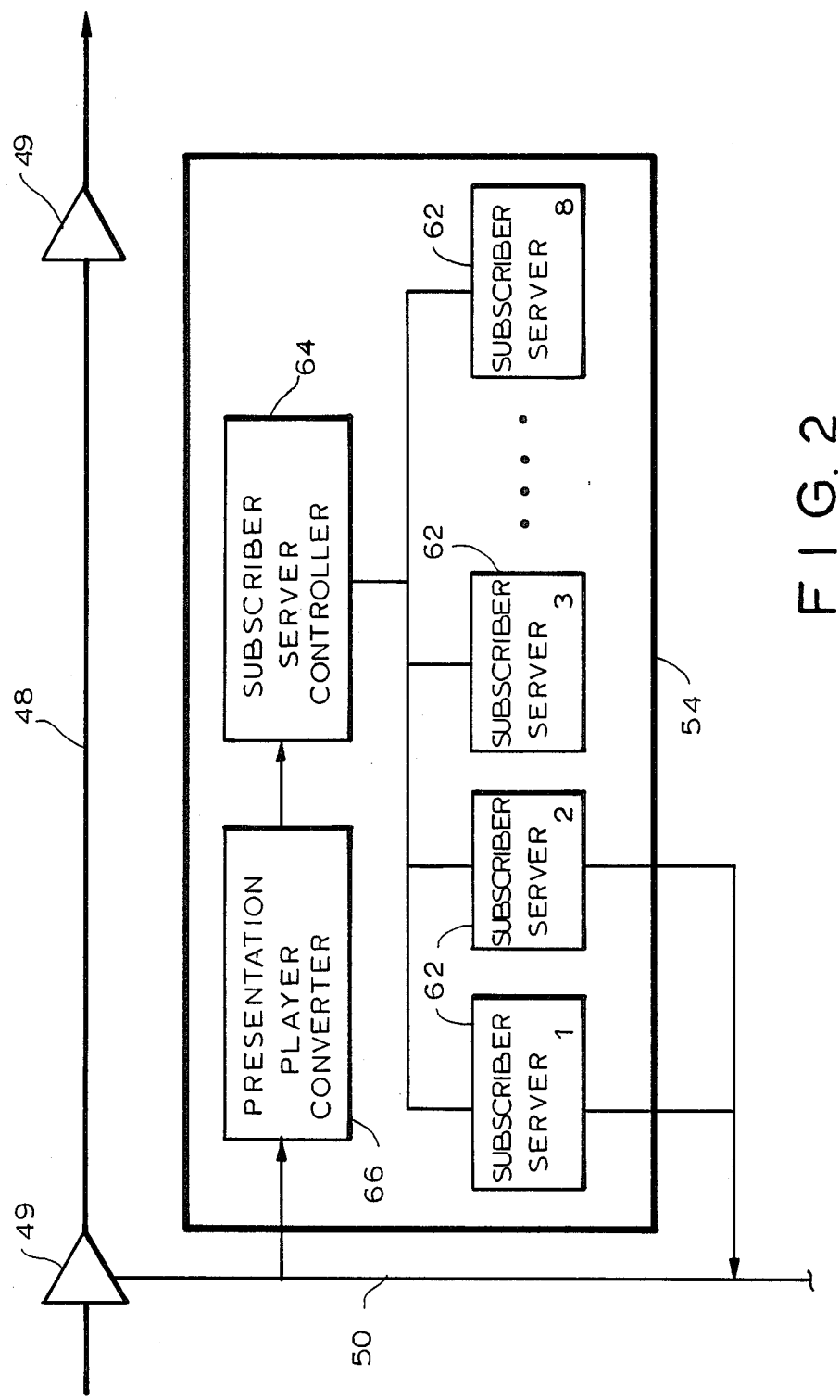
FIG. 2 is an exploded block diagram of the presentation player show in FIG. 1.

In a conventional cable television network incorporating a CATV head end 38, trunk cables 46 emerge from the head end 38 as the primary signal path. Along the trunk cables 46 are a plurality of nodes 48. At each node 48 a bridger amplifier 49 (shown in FIGS. 2,3, and 4) is generally located to amplify the video/audio presentations and to convey them along a secondary cable 50 to the subscriber's home 52. At each node 48, and according to the present invention, a presentation player 54 is located which has as an output at least one secondary cable 50. Eight potential secondary cables 50 are shown in FIG. 2 as being connected to presentation player 54, while only one of the secondary cables 50 is shown in actual use. Along each secondary cable 50 a drop connection 56 to a drop cable 58 extends into the subscriber's home 52 for connection to a television set 60. Each drop cable 58 is typically a coaxial cable.

According to the present invention, the presentation player 54 is a cable-television-outside-plant device about the size of a conventional CATV bridging amplifier and generally has the same power and mounting requirements as a bridging amplifier. Broadly defined, the presentation player is a frequency-agile broadband receiver with a high-speed data demodulator tuned by a narrow-band fixed frequency control channel. The purpose of presentation player 54 is to receive from the CATV head end 38 a stream of digital packets representing the video/audio presentations to convert these digital packets into video/audio presentations, and to transmit particular video/audio presentations, on preassigned output channels to requesting subscribers. Each presentation player 54 processes only those digital packets representative of video/audio presentations requested by subscribers assigned to that presentation player 54. That is, the digital packets representing the video/audio presentations requested by a subscriber are addressed to the specific presentation player 54 assigned the task of processing the video/audio presentation for the subscriber.

Referring to FIG. 2, the presentation player 54 incorporates at least one and as many as eight subscriber servers 62. The subscriber server 62 may be available to only a single subscriber and installed in a home as subscriber apparatus, but typically will be shared among a small group of subscribers according to usage criteria. Any individual subscriber among a predefined group may access a subscriber server 62 by telephoning the LOC 11 service number and logging on. When a subscriber has captured the use of a subscriber server 62, no other subscriber in the same group may use the subscriber server 62 until this first subscriber has finished. The number of subscribers, and of simultaneous users, for whom a single presentation player 54 has been installed depends upon (1) the number of subscriber servers 62 present in the presentation player 54, (2) the assumptions of average usage by the subscribers assigned to each subscriber server 62, and (3) the number of subscriber-selectable output channels available to the LOC 11 for transmitting the visual/audio presentations within the cable television network.

The presentation player shown in FIG. 2 comprises eight subscriber servers 62; however, it is anticipated by the present invention that there may or may not be more than one output channel frequency accessible by two or more subscriber servers. Typically, presentation player 54 will be installed near a bridging amplifier 49 and will serve between one and eight simultaneous users serviced by one to eight secondary cables 50. The specific number of secondary cables (or feeders) 50 distributed from a presentation player 54 is determined by design criteria related to (1) the number of homes served by the CATV feeder cable in question (2) the local CATV-system channel allocation, and (3) the local installation and utility make-ready considerations.

In addition to the subscriber servers 62, each presentation player 54 further includes a subscriber server controller 64 and a presentation player converter 66. The choice of configuration of any presentation player 54 will depend upon the service needs of the area in which the presentation player 54 is installed.

Presentation player converter 66 is tuned to a fixed-frequency, narrow- band control channel in order to tune itself to a broadband channel for receiving the digital packets representative of the vide/audio presentations. In other words, converter 66 receives tuning information on the narrow-band control channel and in response to this information tunes itself to the designated broadband channel carrying the stream of digital packets being broadcast by LOC 11. This self-tuning arrangement causes the presentation player converter 66 to select the correct channel, demodulate the signal to form a digital stream appropriate for local processing, perform forward error correction, and determine whether packetized information within th digital stream being monitored is intended for a particular subscriber server 62 housed within the presentation player 54. In essence, the presentation player converter 66 is a frequency-agile broadband receiver with a high-speed data receiver tuned by a narrow-band fixed frequency control channel.

The output signal from presentation player converter 66 is transmitted to subscriber server controller 64 as shown in FIG. 2. Subscriber server controller 64 is a dispatching device which routes signals from the presentation player converter 66 to the appropriate subscriber server 62. That is to say, subscriber server controller 64 determines the specific subscriber server 62 designated to receive the packetized information. This packetized information includes video and audio packets representative of the video-audio presentation, as well as a presentation script. The presentation script determines when and for what period of time the subscriber server 62 will transmit video and audio frames representative of a particular video/audio presentation. The operation of subscriber server 62 includes the completion of a digital to analog conversion of the video/audio presentation, insertion of graphic information which is constructed from ASCII characters, the mixing in of background audio music and the transmission of the video/audio presentations on the assigned output channels incompatible NTSC format for viewing by the requesting subscriber.

The function of presentation player converter 66 is to locate and tune to that frequency band within the CATV spectrum where the digital information stream is located, and to transformand monitor this information for processing and handling details as required to deliver video/audio presentations to requesting subscribers. This function of presentation player converter 66 is more apparent from the following description of its components.

Referring to FIG. 3, presentation player converter 66 includes fixed-frequency receiver 68 which is permanently tuned to a predetermined narrow-band control channel within the CATV spectrum. This narrow-band control channel, for example 10kHz or less in bandwidth contains the information required by converter 66 to control presentation player 54. Fixed control channel receiver 68 transmits digitally encoded information to a demodulator 70 implemented in VLSI at a rate of approximately 9600 bits per second. At this rate, as many as one hundred million destination addresses can be controlled along with error correction overhead, presentation format variants and a set of diagnostic commands. After the demodulator 70 performs a forward error correction, it passes the signal to a receiver controller 72 which stores handling and processing commands including product presentation script instructions, video/audio packet designations, diagnostic reporting schedules, and local storage of subscriber information screens.

The frequency of the designated, high-speed input channel is transmitted by receiver controller 72 to a frequency-agile broadband receiver 74. Receiver 74 tunes to the channel designated by receiver controller 72. The designated channel signal is sent by receiver 74 to a demodulator 76. Demodulator 76 converts the analog signal into a digital bit stream, performs forward correction and then sends the digital packets thereby received to receiver controller 72. At receiver controller 72 the digital packets intended for the presentation player 54 are selected and transmitted to subscriber server controller 64.

Subscriber server controller 64 sends the digital packets of information to one of the subscriber servers 62 which resides in the presentation player 54. In accordance with addressing information included within the digital packet. Each subscriber sever 62 housed within a presentation player 54 is responsible for processing the digital packets of information designated for subscribers assigned to that particular presentation player.

Referring to FIG. 4, the packets of information transmitted from subscriber server controller 64, are received by a small CPU 78 in the subscriber server 62 and are stored in an RAM pool 80. CPU 78 determines which of the information packets is a script packet and then uses the script packet to determine how the video and audio packets are to be combined with graphic information in real time for viewing by the subscriber. The script packets also define fidelity and duration of background and overlay audio, as well as screen location and duration of video images with accompanying visual text. Moreover, the script packets may define an automated series of audio/video sequences in fulfilling a specific request from a subscriber. In case of error detection during preparation of a product presentation sequence, the subscriber error controller 64 will substitute a substitute message from local RAM to communicate information or instructions to the requesting user.

From CPU 78, the script packets are transmitted to a video expander 82 or an audio expander 84 depending on whether they contain visual or audio information. A video expander 82 includes graphic overlay capabilities, as well as functions for reversing the process as defined by a video compression algorithm. Audio expander 84 decompresses the audio packets and converts them into real time. The video and audio packets are also processed by video processor 86 and audio processor 88, which includes conversion of the digital formatted audio and video into an analog format. After the video and audio information have been queued and expanded, they are used to modulate a subscriber-selectable CATV channel by means of an output modulator 90, a frequency-agile transmitter, which transmits to the requesting subscriber the assembled presentation in NTSC format on the frequency assigned by the CPU 78 as directed by the LOC 11. Accordingly, it is through the presentation player 54 that the requested video/audio presentations are transmitted on pre-assigned output channels to the requesting subscribers.

Although the illustrative embodiment of the present invention has been described in detail with reference to the accompanying drawings, it is to be understood that the invention is not limited to this precise embodiment and that various changes or modifications may be effected therein by one skilled in the art without departing from the scope or spirit of the invention.

What is claimed is:

1. In an interactive communication system wherein subscribers select from a plurality of video/audio presentations, said video/audio presentations being transmitted in the form of digital packets of information to a plurality of presentation players, each said digitial packet uniquely addressed to said requesting subscriber, said presentation players each comprising:

converter means tuned to a channel for monitoring a digital stream of information including said digital packets representative of selected video/audio presentations wherein said digital packets include video packets, audio packets, and script packets which determine the manner in which video and audio packets are combined into a video/audit presentation, and for detecting, for further processing, digital packets uniquely addressed to predetermined ones of said requesting subscribers;

controller means receiving said uniquely addressed digital packets and transmitting each said packet to a pre-assigned subscriber sever according to its unique address; and at least one said subscriber server receiving uniquely addressed digital packets, converting said digital packets into analog formatted video/audio presentations, and transmitting said video/audio presentations to said requesting subscriber.

2. The presentation player in accordance with claim 1 comprising no more than eight subscriber servers.

3. The presentation player in accordance with claim 1 wherein said converter means is tuned to a broadband channel.

4. The presentation player in accordance with claim 1 wherein said subscriber server transmits said video/audio presentation on a pre-assigned output channel in NTSC format.

5. The presentation player in accordance with claim 1 wherein said subscriber server further comprises a computer processing unit for receiving and processing said uniquely addressed digital packets and for storing such packets into a RAM memory.

6. The presentation player in accordance with claim 1 wherein said converter means is tuned to said channel according to tuning information received form a prefixed frequency, narrow-band control channel.

7. The presentation player in accordance with claim 6 wherein said narrow-band control channel is of a bandwidth of 10 kHz or less.

8. The presentation player in accordance with claim 6 wherein said converter means further comprises a fixed-control-channel receiver for receiving said narrow-band control channel.

9. The presentation player in accordance with claim 8 wherein said fixed-control-channel receiver transmits digitally encoded information to a demodulator at a rate of approximately 9600 bits per second, the output of said demodulator is transmitted to a receiver controller which designates to a frequency-agile broadband receiver the monitoring channel.

10. The presentation player in accordance with claim 1 wherein said channel is within the cable television frequency spectrum.

11. A presentation player for receiving video/audio presentations selected by a subscriber of an interactive communication system, said vide/audio presentations being transmitted in the form of digital packets of information, each said digital packet uniquely addressed to said requesting subscriber, said presentation player comprising:

converter means tuned to a channel for monitoring a digital stream of information including said digital packets representative of selected video/audio presentation wherein said digital packets include video packets, audio packets, and script packets which determine the manner in which video and audio packets are combined into a video/audio presentation, and for detecting, for further processing, digital packets uniquely addressed to predetermined ones of said requesting subscribers;

controller means receiving said uniquely addressed digital packets and transmitting each said packet to a pre-assigned subscriber server according to its unique address; and at least one said subscriber sever receiving uniquely addressed digital packets, converting said digital packets into analog formatted video/audio presentations, and transmitting said vide/audio presentations to said requesting subscriber.

12. In a cable television network, a device for distributing to subscribers video/audio presentations selected by said subscribers, comprising:

means for receiving a stream of digital packets of information through a distribution medium said digital packets representative of video/audio presentations selected by said subscribers wherein said digital packets include video packets, audio packets, and script packets which determine the manner in which video and audio packets are combined into a video/audio presentation, means for converting said digital packets into analog formatted video/audio presentations;

means for transmitting said analog formatted video/audio presentations on pre-assigned output channels to said requesting subscribers.

13. The device in accordance with claim 12 wherein said distribution medium is a cable television distribution trunk.

14. The device in accordance with claim 12 wherein said video/audio presentations include still-frame images.

15. The device in accordance with claim 14 wherein said video/audio presentations further include one or more audio message.

* * * * *